(12) United States Patent
Byrd et al.

(10) Patent No.: US 6,910,181 B2
(45) Date of Patent: *Jun. 21, 2005

(54) EXTENSIBLE ORDERED INFORMATION WITHIN A MARKUP LANGUAGE DOCUMENT

(75) Inventors: Marion Michael Byrd, Bellevue, WA (US); Paul Christian David, Redmond, WA (US); Michael Irvin Hyman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 237 days.

This patent is subject to a terminal disclaimer.

(21) Appl. No.: 09/907,298

(22) Filed: Jul. 17, 2001

(65) Prior Publication Data

US 2001/0044812 A1 Nov. 22, 2001

Related U.S. Application Data

(63) Continuation of application No. 09/006,732, filed on Jan. 14, 1998, now Pat. No. 6,317,760.

(51) Int. Cl.[7] .......................... G06F 15/00; G06F 17/21; G06F 15/16
(52) U.S. Cl. ..................... 715/513; 715/501.1; 715/514; 709/200; 709/202
(58) Field of Search ...................... 715/501.1, 513–514; 709/200–202; 345/760; 717/108

(56) References Cited

U.S. PATENT DOCUMENTS

| | | |
|---|---|---|
| 4,710,885 A | 12/1987 | Litteken |
| 4,989,133 A | 1/1991 | May et al. |
| 5,414,644 A | 5/1995 | Seaman et al. |
| 5,506,963 A | 4/1996 | Ducateau et al. |
| 5,530,859 A | 6/1996 | Tobias, II et al. |
| 5,553,222 A | 9/1996 | Milne et al. |
| 5,596,695 A | 1/1997 | Hamada et al. |
| 5,623,656 A | 4/1997 | Lyons |
| 5,659,793 A | 8/1997 | Escobar et al. |

(Continued)

OTHER PUBLICATIONS

Hendrix et al., Language independent generation of graphical representations of source code, ACM Annual Computer Science Conference, 1995, pp. 66–72.*

*The Virtual Reality Modeling Language Specification, Version 2.0,* n.pag. Online. Internet: available http://www.web3d.org.vrml2.0/final/spec.

Dragan, Rich, "Lights, Camera, Action! Java Reaches Extreme Multimedia with Microsoft Direct Animation," *Computer Shopper,* vol. 17, No. 7, p. 580, Jul. 1997.

(Continued)

*Primary Examiner*—William L Bashore
(74) *Attorney, Agent, or Firm*—Christensen, O'Connor, Johnson, Kindness, PLLC

(57) ABSTRACT

An extensible set of information is defined within a Web page, which is retrievable in an ordered manner. Web page variables are defined and populated with commands and data which are executed according to the order defined by the naming convention employed in defining the Web page variable names. Within a Hypertext Markup Language (HTML) document, an open-ended series of commands are defined to be read and processed by a control without having to extend HTML or using an alternative language. For instance, a series of vector graphics commands can be defined using PARAM Tag statements and subsequently executed by a Web control in the specified order. Moreover, by defining an graphics object in this manner, a standard ASCII text editor can be used to review and modify the commands, and the graphics can be completely defined within the HTML document which does not require any external reference and thus reduces processing and network overhead.

16 Claims, 5 Drawing Sheets

```
250
    <OBJECT ID="Square4"
        CLASSID="CLSID:5FD6A143-372A-11D0-A521-0080C78FEE85"
        STYLE="TOP:0px; LEFT:0; WIDTH:100%; HEIGHT:100%">
260 ─ <PARAM NAME="Line0001" VALUE="SetLineStyle(0)">
270 ─ <PARAM NAME="Line0002" VALUE="SetFillStyle(1)">
280 ─ <PARAM NAME="Line0003" VALUE="SetFillColor(0, 255, 0)">
290 ─ <PARAM NAME="Line0004" VALUE="Rect(-25,-25,50,50,0)">
    </OBJECT>
```

EXAMPLE OBJECT DEFINITION

U.S. PATENT DOCUMENTS

| | | | |
|---|---|---|---|
| 5,717,879 A | | 2/1998 | Moran et al. |
| 5,737,531 A | | 4/1998 | Ehley |
| 5,742,762 A | | 4/1998 | Scholl et al. |
| 5,758,093 A | | 5/1998 | Boezeman et al. |
| 5,765,006 A | * | 6/1998 | Motoyama ................ 715/514 |
| 5,768,505 A | | 6/1998 | Gilchrist et al. |
| 5,777,612 A | | 7/1998 | Kataoka |
| 5,815,689 A | | 9/1998 | Shaw et al. |
| 5,822,587 A | * | 10/1998 | McDonald et al. ......... 717/108 |
| 5,826,080 A | | 10/1998 | Dworzecki |
| 5,838,906 A | * | 11/1998 | Doyle et al. ............... 709/202 |
| 5,845,075 A | * | 12/1998 | Uhler et al. ............... 709/200 |
| 5,862,372 A | | 1/1999 | Morris et al. |
| 5,884,056 A | | 3/1999 | Steele |
| 5,886,995 A | | 3/1999 | Arsenault et al. |
| 5,889,950 A | | 3/1999 | Kuzma |
| 5,892,327 A | | 4/1999 | Buij et al. |
| 5,892,507 A | | 4/1999 | Moorby et al. |
| 5,903,892 A | | 5/1999 | Hoffert et al. |
| 5,953,005 A | | 9/1999 | Liu |
| 5,973,696 A | * | 10/1999 | Agranat et al. ............ 345/760 |
| 5,983,140 A | | 11/1999 | Smith et al. |
| 5,987,523 A | | 11/1999 | Hind et al. |
| 6,012,086 A | | 1/2000 | Lowell |
| 6,178,432 B1 | * | 1/2001 | Cook et al. ................ 715/513 |
| 6,317,760 B1 | * | 11/2001 | Byrd et al. ................ 715/513 |

OTHER PUBLICATIONS

Dragan, Rich, "What's the Code", *Computer Shopper*, vol. 17, No. 7, p. 580, Jul. 1997.

Campbell, Monica, "Macromedia Debuts Flash 2.0 With Sound," *MacWEEK*, vol. 11, No. 13, p. 14, Mar. 31, 1997.

Koulouthros, Yvonne, "Designs on the Future," *PC Magazine*, vol. 15, No. 22, p. 36, Dec. 17, 1996.

Hamblen, Matt, "Tool Promises Web Authoring Without HTML," *Computerworld*, vol. 30, No. 50, p. 9, Dec. 9, 1996.

Jones, Chris, "FreeHand Has Designs on 'net; Macromedia tool streams 3–D from Web Servers to Users", *InfoWorld*, vol. 18, No. 36, p. 35, Sep. 2, 1996.

"MacroMedia Revamps Freelance Graphics Suite," *PC Week*, vol. 13, No. 35, p. 27, Sep. 2, 1996.

Sliwa, Carol, "Macromedia Gives Shockwave More Jolt; Users to Get Higher Quality Streamed, Compressed Audio," *Network World*, vol. 13, No. 31, p. 37, Jul. 29, 1996.

Jones, Chris, "Director Plug–ins to Allow Live Audio, Video Streaming on Web," *InfoWorld*, vol. 18, No. 21, p. 52, Mar. 18, 1996.

Elia, Eric, "Macromedia Unveils Shockwave and Director 5," *Newmedia*, vol. 6, No. 1, p. 19, Jan. 2, 1996.

Yamada, Ken, "Macromedia an Early Adopter of Intel MMX," *Computer Reseller News*, No. 700, p. 57, Sep. 9, 1996.

"Intergraph Canada, Macromedia Unite on Multimedia Authoring", *Computing Canada*, vol. 22, No. 16, p. 49, Aug. 1, 1996.

Jones, Chris, "Macromedia Streams Digital Audio on Web; Shockwave Upgrade Supports Near–CD–Quality Sound," *InfoWorld*, vol. 18, No. 31, p. 29, Jul. 29, 1996.

Ryer, Kelly, "Sounds in Shockwave," *MacWEEK*, vol. 10, No. 29, p. 14, Jul. 2, 1996.

Ozer, Jan, "Macromedia Director Brings Net Closer to Real Time: Streaming Multimedia to Replace Download–to–Disk Movies", *Computer Shopper*, vol. 16, No. 6, p. 533, Jun. 1996.

Safreed, Sean J., "New Directions for Director 5.0", *MacUser*, vol. 12, No. 5, p. 26, May 1996.

Darrow, Barbara, "Macromedia Revises Director," *Computer Reseller News*, No. 676, p. 151, Mar. 25, 1996.

Jones, Chris, "Director Plug–ins to Allow Live Audio, Video Streaming on Web", *InfoWorld*, vol. 18, No. 12, p. 52, Mar. 18, 1996.

"Macromedia," *Multimedia Business Report*, vol. 5, p. 7, Mar. 15, 1996.

Jones, Chris, "Macromedia Speeds Up with Director 5," *InfoWorld*, vol. 18, No. 11, p. 30, Mar. 11, 1996.

"Structured Graphics Control," Microsoft Developer Network Library Edition—Oct. 1997, Microsoft Corporation (1997).

David Zhao, "Digital Clock," http://javaboutique.internet.com/dclock/Lynda, Jan. 13, 2001.

Lynda Hardman and Dick C.A. Bulterman, "Multimedia Authoring Paradigms," pp. 1–3, The Institution of Electrical Engineers, IEEE 1995.

Shah, P. "Multimedia on the Internet," Computer Software and Applications Conference, I COMPSAC '96., Proceedings of $20^{th}$ International, pp. 150, Aug. 21–23, 1996.

Lee et al. "A systematic Approach to Design the Network–based Learning Environment for Home and Office," IEEE 1996, pp. 335–344.

J.D.N. Dionisio, A.F. Cardenas, "A unified data model for representing multimedia, timeline simulation data", Knowledge and data engineering, IEEE Transaction, Sep.–Oct. 1998 pp. 746–767.

S. Ronngren, B. Shirazi and D. Lorts, "Empirical evaluation of weighted and prioritized static scheduling heuristics for real–time multiprocessing," Parallel and Distributed Real–Time Systems, Apr. 28–29, 1994, pp. 58–63.

M.G. Harbour, M.H. Klein and J.P. Lehoczky, "Fixed priority scheduling periodic tasks with varying execution priority", Real–Time System Symposium, Dec. 4–6, 1991, pp. 116–128.

Digital Equipment Corporation, "FOCAL." ® 1969 Digital Equipment Corporation. Reprinted at www.cs.uiowa.edu/jones/pdp8/focal/by Douglas W. Jones with permission in 1997.

Klein, Rob, "TagArea" (Java™ applet), uploaded Feb. 19, 1996 to javaboutique.internet.com.

Kay, Marcus, "animateButton" (Java ™ applet), uploaded Sep. 23, 1996 to javaboutique.internet.com.

Hars, Florian, "ANButton" (Java ™ applet, including source code), uploaded Feb. 14, 1996 to javaboutique.internet.com.

Shaio, Sami, "Chart" (Java ™ applet), uploaded Sep. 13, 1996 to javaboutique.internet.com.

Gates, Bill, "Q&A: Which chief executive officers do you admire?" found at www.microsoft.com/BillGates/1996Q&A/QA961217.htm and dated Dec. 17, 1996.

"Microsoft Visual Basic 5.0, Control Creation Edition Launches Explosion in Component Market" (Microsoft Corporation press release dated Dec. 11, 1996).

Microsoft Internet Explorer 4.0 White Paper found online at www.microsoft.com/windows/ie/press/iwhite/white003.htm, last updated Jul. 2, 1997. ©1997.

Uniform Resource Locator. See RFC1738, "Uniform Resource Locators," T. Berners–Lee, L. Masinter, and M. McCahill, Dec. 1994, available at http://info.internet.isi.edu/in–notes/rfc/files/rfc1738.txt.

HTML 3.2 DTD (Document Type Declaration), Jan. 14, 1997, available at http://www.3org/TR/REC–html32html.

Graham, Ian S. HTML Sourcebook, Third Edition. John Wiley and Sons, New York. ISBN 0–471–17575–7. © 1997. Published Feb. 24, 1997.

Raggett, Dave, Hypertext Markup Language Specification Version 3.0 (Internet Draft). Mar. 28, 1995. available at http://newton.ex.ac.uk/general/docs/Web_docs/draft–ietf–html–specv3–00.txt.

Poole, Lon, McNiff, Martin, Cook, Steven. Apple® II User's Guide For Apple® II Plus and Apple® IIe, Third Edition. Osborne McGraw–Hill, Berkeley, CA. ISBN 0–07–881176–7. © 1985.

Naick, Bijoy, "VertTicker.java" (Java™ applet), found on javaboutique.internet.com, source code dated Dec., 1997.

Stern, Barry, "PDP–8 Simulator" m(Java™ applet), submitted Jan. 20, 1997 to www.jars.com.

* cited by examiner

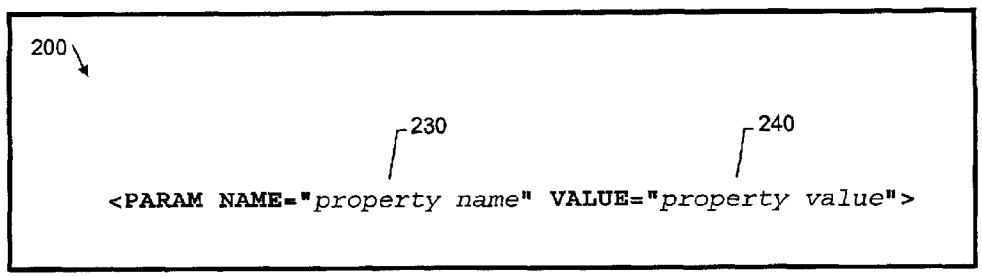
FIG. 2A - PARAM Statement
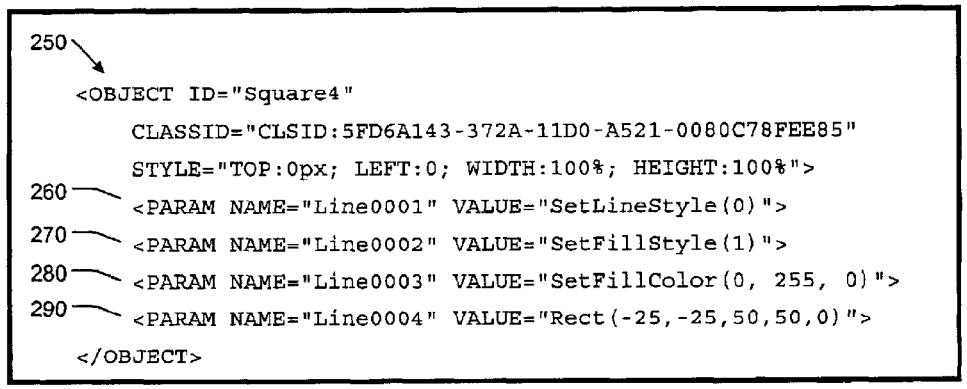
FIG. 2B - EXAMPLE OBJECT DEFINITION

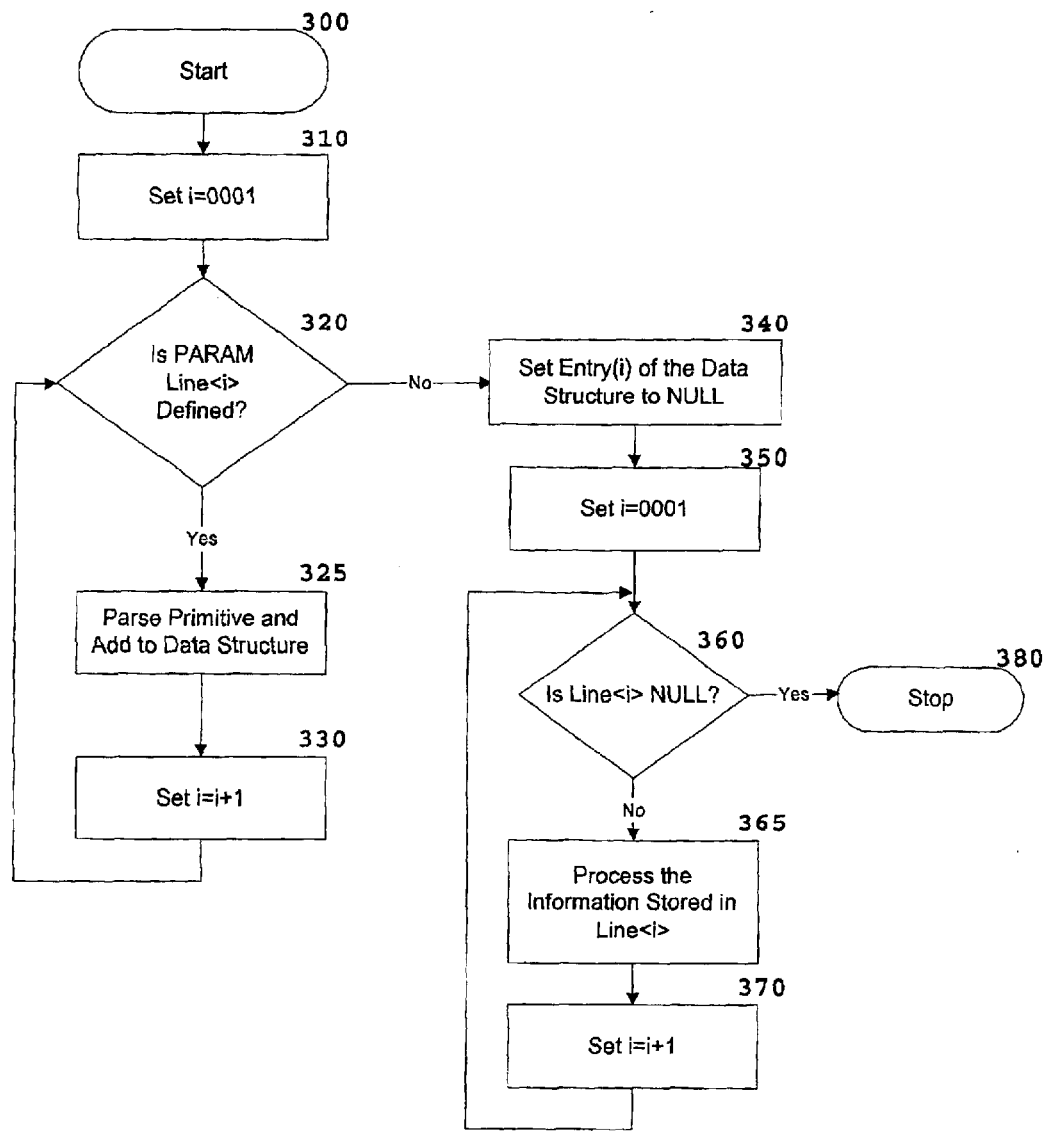
FIG. 3 - PROCESSING BY THE WEB CONTROL

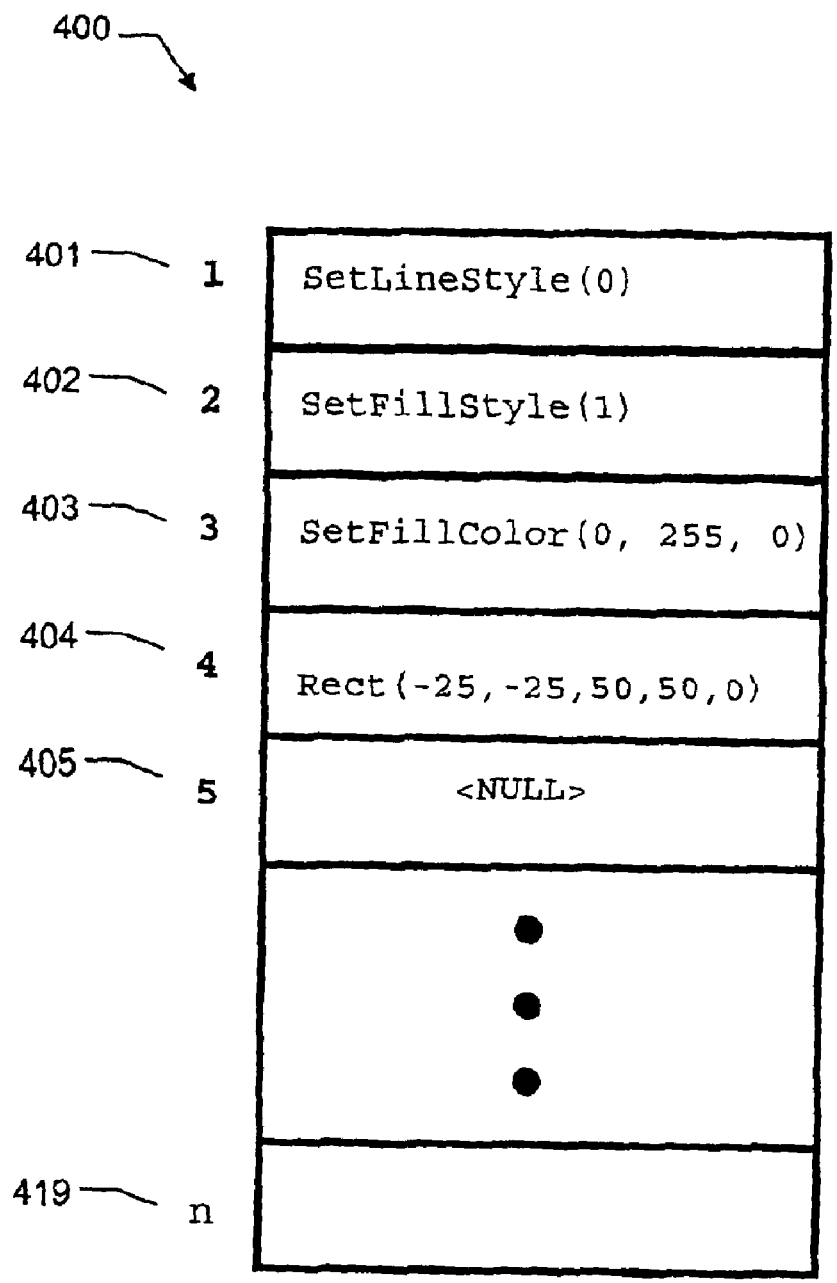
FIG. 4 - Display List Data Structure

Structured Graphics Control Method PARAM Tag Syntax

```
<OBJECT ID=object
        STYLE="WIDTH:width; HEIGHT:height; Z-INDEX:z-index"
        CLASSID="CLSID:369303C2-D7AC-11d0-89D5-00A0C90833E6">
    <PARAM NAME="LINEnnnn" VALUE="method">
</OBJECT>
```

Parameters

| | |
|---|---|
| object | String identifying the object. |
| width | Desired width for the Structured graphics drawing area (pixels or percentage of page width) |
| height | Desired height for the Structured graphics drawing area (pixels or percentage of page height) |
| z-index | Desired z-index value for the Structured graphics drawing area (integer) |
| nnnn | A sequence number for the method execution order. Must be in order starting with 0001. Skipped sequences halt execution. |
| method | One of the elements in the list below. |

| Method | Description |
|---|---|
| Arc | Creates a single circular or elliptical arc. |
| FillSpline | Creates a closed spline shape, defined by a series of points. |
| Oval | Creates an ellipse. |
| Pie | Creates an elliptical arc closed at the center of the bounding rectangle to form a wedge (pie) shape. |
| Polygon | Creates a closed polygon. |
| PolyLine | Creates a segmented line. |
| PolySpline | Creates an open spline shape, defined by a series of points. |
| Rect | Creates a rectangle. |
| RoundRect | Creates a rounded rectangle. |
| SetFillColor | Sets the foreground and background colors for graphic fills. |
| SetFillStyle | Sets the type of fill. |
| SetFont | Sets the font for the control. |
| SetGradientFill | Specifies the start and end points for a gradient fill. |
| SetHatchFill | Specifies whether the hatch fill is transparent. |
| SetLineColor | Sets the line color for drawing graphics. |
| SetLineStyle | Changes the line style for the current shape. |
| SetGradientShape | Sets the shape of a gradient to be an outline of a polygon shape. |
| SetTextureFill | Sets the texture source to be used to fill a structured graphics shape. |
| Text | Creates a string with the current font and color. |

FIG. 5 – Structured Graphics Control Methods

EXTENSIBLE ORDERED INFORMATION WITHIN A MARKUP LANGUAGE DOCUMENT

RELATED APPLICATIONS

This application is a continuation of U.S. application Ser. No. 09/006,732, filed Jan. 14, 1998, now U.S. Pat. No. 6,317,760, issued Nov. 13, 2001,

FIELD OF THE INVENTION

This invention relates to computer programming, and more particularly, to a control and method for retrieving information in an ordered manner from an extensible set of information defined within a Web page.

BACKGROUND OF THE INVENTION

The Internet and the World Wide Web are rapidly expanding, with businesses and individuals hosting their own Web pages. This has created a demand for richer Web page capabilities, especially in the area of graphics and multimedia. However, the design and programming of the enhanced capability Web pages must remain simple, as not all Web page owners are sophisticated computer users. Nor should the use of graphics in a Web page require using external applications to program and debug these enhanced capabilities, which could greatly increase the cost of a solution. Instead, a user-friendly solution is desirable, where a standard text editor could be used and with human readable commands.

Most files downloaded and opened with a Web browser are pages formatted with Hypertext Markup Language (HTML). Native HTML provides the basic foundation for defining a Web page, although it does not specify a method for storing and retrieving a sequential series of extensible information, such as vector graphics commands and data. As such, graphics commands and data are typically stored in external files in a proprietary format which are accessed by the Web control via a Uniform Resource Link (URL). To create these graphics, graphics design programs are available to help the user, but these are an additional expense and require running the design program to modify the graphics. Furthermore, the graphics information is typically stored in a non-human readable (binary) format, which makes it difficult to debug because a user can not merely review and edit the HTML source code. Additionally, increased overhead, such as processing and network costs, are encountered when URL calls are made to process or execute external files.

Web controls and HTML conventions do not provide for reading defined information back in an ordered way. The standard definitions of HTML and the semantics of the HTML commands do not provide a method for retrieving a sequential series of commands or data, such as inquiring as to the value of the first variable defined, then the value of the second variable defined, etc. Rather, a Web page has a random, non-ordered address space, whereby the value of a variable is retrieved by specifically asking for it by name. Moreover, there is no concept of the ordering of variables inherent in the definition of HTML variables. Thus, a user cannot define a series of information using HTML in which a control can then sequentially read and process this data or execute these commands. This limits the capabilities of Web pages, including the availability of graphics capabilities in which performing a series of operations (such as linear transformations) is commonly needed.

SUMMARY OF THE INVENTION

According to the invention, a method provides an extensible ordered set of data and commands in a Web page, and a control reads and stores this information, and subsequently processes the series of information. Thus, without having to extend HTML or provide an alternate language such as Virtual Reality Modeling Language (VRML), the HTML source of a Web page includes a series of commands which are read, stored, and subsequently executed in a specified order by the control, such as a browser. In this manner, a sequence of graphics commands can be specified in the ASCII source, with these commands being executed by a Web control at some later time in the predefined order.

In accordance with the invention, a set of Web page variables are first defined, whose names correspond with a naming convention to which a predetermined ordering is attached. The commands and data to be processed are stored as the values of these variables. A Web control then accesses these variables and processes the statements stored therein in the order determined by the variable naming convention. Furthermore, by defining an open-ended naming convention, the control is not required to know the number of variables to process. Rather, the control processes the sequence in accordance with the naming convention until such time as one of the variables is not defined, indicating the end of the sequence.

More specifically, an embodiment of the invention provides for defining an extensible, ordered series of information within the confines of an HTML document by exploiting the HTML capability to define an open-ended set of property names with values using the HTML PARAM Tag statement. In addition, the semantics of a property value are modified to be that of a command and/or data to be executed or processed, rather than a display property of the object in which it is defined.

In keeping with the invention, the naming convention provides the desired ordering for the information stored in the Web page variables. One embodiment uses the format of a constant alphabetic prefix appended with a numerical suffix, where the values of the suffix are sequential in nature. For instance, a series of variable names could be Line0001, Line0002, Line0003, etc. As readily evident to one skilled in the art, numerous other naming schemes could be adopted, such as using alphanumeric characters instead of numbers or using a NULL prefix, which would be in keeping with the spirit, character, and scope of the invention.

It is further contemplated that Web page variables, including those defined by PARAM Tag statements, could be used to define within the Web object the syntax of the particular naming convention to be used. This could include setting the prefix, suffix, and numeric spacing between variables (e.g., 1, 10), as well as the name of the first variable of the extensible sequence. Moreover, multiple series of commands can be defined within the same object by using a different naming convention, such as using two different prefixes.

Once a control encounters Web page variables defined in accordance with the naming convention, the control will subsequently process the information in the order determined according to the naming convention employed. In one embodiment, the control will first retrieve and parse all the commands stored in the Web page variables to build a table reflective of the sequence in which to process the commands. In this manner, the control then can more efficiently interpret and execute the commands. The values of these variables are retrieved until a NULL value is retrieved for the next variable name according to the naming convention, which indicates the end of the series of information.

Thus, by redefining the meaning of HTML property values and defining property variables according to the naming convention, a method for providing an open-ended, extensible series of information within a HTML document is realized. Furthermore, this method does not require an expansion of HTML, the information is stored in a single HTML document which is human readable, loaded with a single file load operation, directly extensible by the author, created and edited using a standard ASCII text editor, or produced by most any development tool including being downloaded and created from the server via an Active Server File (ASP) or other server side script (e.g., through a language that supports Common Gateway Interface (CGI)).

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIG. 2A is a diagram showing the HTML PARAM Tag statement;

FIG. 2B is a diagram illustrating a sample object definition of an extensible set of information for retrieval in an ordered manner;

FIG. 3 is a high-level flow diagram describing the steps for defining an extensible set of information and for retrieval and processing the information in an ordered manner;

FIG. 4 is a block diagram of a table for storing the information in an ordered manner during processing; and FIG. 5 present descriptions, syntax, parameters and graphics methods of one embodiment in accordance with the present invention.

DETAILED DESCRIPTION OF THE PREFERRED EMBODIMENT

Figure 1:
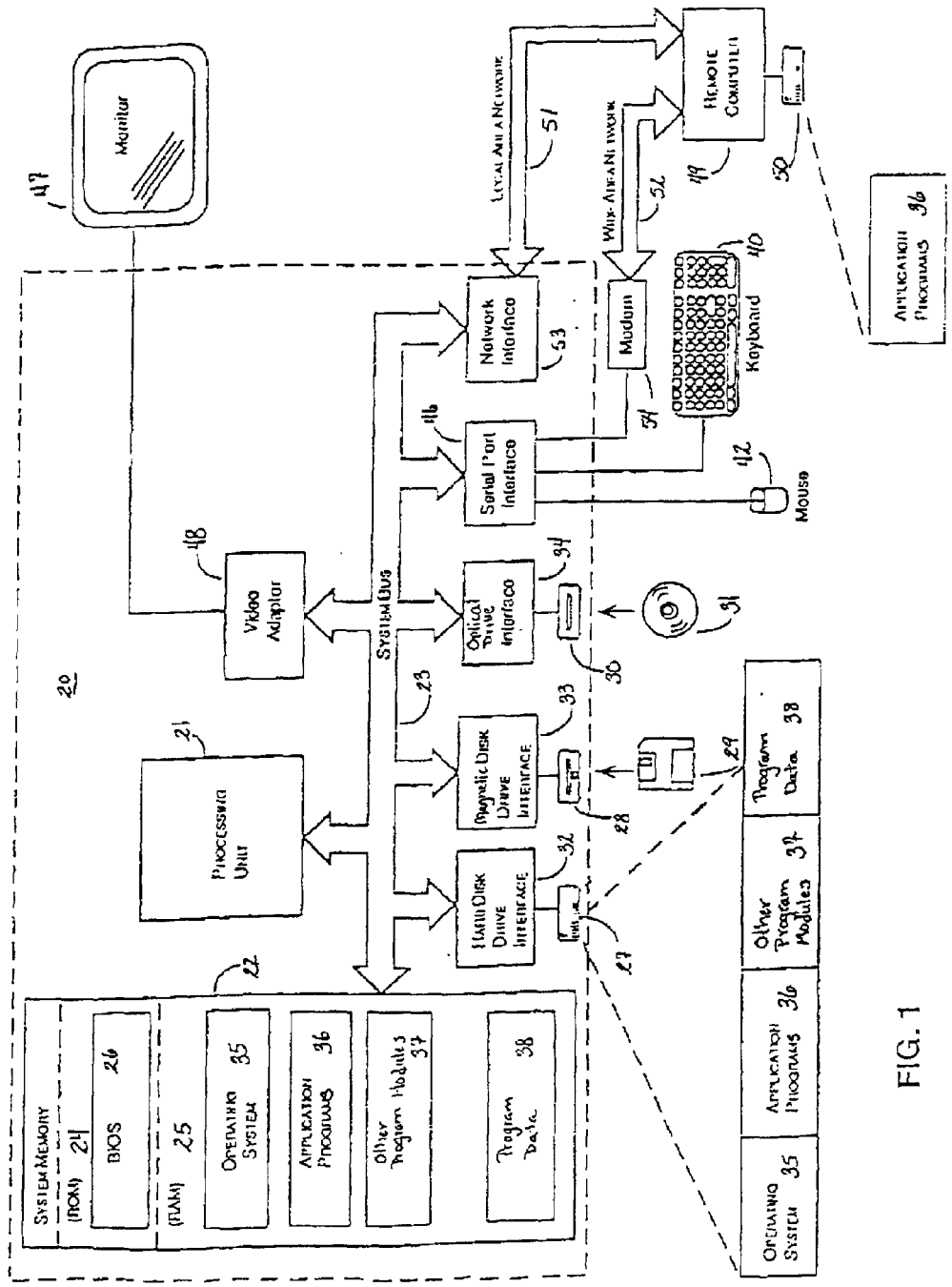
FIG. 1 is a block diagrams of an exemplary operating environment in which the invention may be implemented, including a computer system for providing the extensible ordered information within a Web page in accordance with the invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, the control and extensible ordered set of data and commands are stored in system memory 22, and the control and commands are executed by processing unit 21. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Turning now to FIG. 2A, shown is a standard Hypertext Markup Language (HTML) PARAM Tag statement 200. A PARAM Tag statement is conventionally used to set the property values for a given Web page object and has up to four parameters, two of which are used in the PARAM Tag statement 200. FIG. 2A also illustrates the syntax of the PARAM Tag statement as currently defined with HTML. The property name 230 is a text string identifying the variable name, and property value 240 is a text string identifying the value to which to set the property name 230.

By definition, HTML tags are codes enclosed in angle brackets that are used by a Web browser to determine the structure and appearance of an HTML document, such as graphic elements and text formatting. A PARAM definition has limited scope, as it is only valid within an OBJECT element of an ActiveX object, within an APPLET of a JAVA applet, or within an EMBED tag. A control cannot ask for a list of all available property values; rather it can only ask for the value for a specified property name, and it receives the value or an indication that the requested property name has not been defined.

Shown in FIG. 2B is an example object 250 which contains a sequence of commands to be executed in a particular order. PARAM Tag statements (260, 270, 280, 290) define four variables Line0001, Line0002, Line0003, and Line0004 whose values correspond respectively to the four vector graphics commands of SetLineStyle(0), SetFillStyle(1), SetFillColor(0, 255, 0), and Rect(-25,-25, 50,50,0). For convenience, the variables are named using the prefix of "Line" with a suffix of a four digit number beginning with "0001". By convention, the name of the first variable accessed is Line0001, with subsequent accesses to the series of Line0002, Line0003, etc. until a given variable is not defined (i.e., a NULL value is returned). Thus, according to the invention described herein, the commands defined using PARAM Tag statements are to be executed by the Web control in the following order: SetLineStyle(0), SetFillStyle(1), SetFillColor(0, 255, 0), and Rect(-25,-25, 50,50,0). In FIG. 2B, the PARAM Tag statements (260, 270, 280, 290) are listed and defined in the same order in which they are to be executed. This makes it easier for the Web page programmer and human readers to perceive the execution order of the statements. However, because the naming of the variables defines the sequence of processing of the commands stored as the variable values, the ordering of the PARAM Tag statements (260, 270, 280, 290) is inconsequential to the order to which they are retrieved and executed by the Web page control.

FIG. 5 further illustrates the definition of an object 250 (FIG. 2B) and PARAM Tag statements 200 (FIG. 2A) by presenting a structured graphics control embodiment in accordance with the present invention. The structured graphics control executes graphics methods stored as values 240 (FIG. 2A) in PARAM Tag statements 200. A subset of the possible graphics methods is listed in FIG. 5. This embodiment is further described in "Structured Graphics Control", Microsoft Developer Network Library Edition—October 1997, Microsoft Corporation (1997), which is hereby incorporated by reference.

Turning now to FIG. 3, shown is a flow diagram illustrating the processing by a control of the information (i.e., commands, data) defined by PARAM Tag statements, such as for the object illustrated in FIG. 2B. This sequence of processing is described below with reference to display list data structure 400 illustrated in FIG. 4.

Beginning in step 310, a counter variable i is set to 0001, which corresponds to the suffix value for the first variable name in the sequence defined by the naming convention. Then, as determined in step 320, while there is a variable defined with the property name Line<i> (where "Line" is the prefix as determine in accordance with the invention, and "<i>" represents the current value of the counter variable i), then in step 325, the value of the variable with the property name Line<i> is retrieved, parsed, and added to a data structure containing the sequence of commands. Finally, in step 330, the counter variable i is increased by one (in accordance with the exemplary naming convention), and the retrieving of the remaining defined property variables continues with step 320.

When there is no longer any property variable defined in accordance with the invention as determined in step 320, processing transfers to step 340 which sets the entry at position i of the display list data structure 400 to NULL to indicate the end of the sequence of information. In step 350, the counter variable i is set to one for processing of the commands or data stored in the display list data structure 400. Next, as determined in step 360, while the entry at position i of the display list data structure 400 is not NULL, then process the information stored at position i in step 365, and then increase the value of i by one in step 370. When a NULL entry is encountered at position i of the display list data structure 400, the end of the series of information has been reached.

Turning now to FIG. 4, shown is a display list data structure 400 which is in the form of an array, with indices ranging from 1 to n, where n is some number larger than the number of commands defined by the PARAM Tag statements. The commands are stored in the array in the order in which they are to be processed by the Web control. In other words, the first command is located at entry 401 corresponding to index number 1, the second command at entry 402 corresponding to index number 2, etc. A NULL entry in the display list data structure 400, such as at entry 415, indicates the end of the sequence of commands.

As shown in FIG. 4, display list data structure 400 has been populated according to the processing defined in the flow diagram of FIG. 3 for the example OBJECT definition illustrated in FIG. 2. The commands are stored, rather than immediately processed as read, which allows their processing at later times, including redrawing the graphics objects after a Web page has been dirtied. As shown, display list data structure 400 comprises an array containing the commands defined by the PARAM Tag statements 260, 270, 280 and 290 from FIG. 2B, which are respectively located in entries 401, 402, 403, and 404 of the array. As would be evident to one skilled in the art, there are many embodiments for display list data structure 400 that are possible without deviating from the scope and spirit of the invention. These include using a linked list, a two dimensional array contain both the PARAM name and PARAM value, or eliminating the display list data structure 400 in its entirety and processing each piece of information stored as it is retrieved from the variables.

In view of the many possible embodiments to which the principles of our invention may be applied, it should be recognized that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a computer system, a method of processing a markup language document written in a markup language, comprising the steps of:
    presenting a plurality of requests for values for a plurality of property variables, each of the plurality of property variables named in accordance with an order-defining naming convention to indicate an execution sequence;
    receiving from the markup language document the values for the plurality of property variables requested, the markup language document having a plurality of statements defining the property variables;
    obtaining from the value of each of the plurality of property variables a command associated with said each property variable; and
    executing the commands associated with the respective property variables in the execution sequence indicated by the names of the property variables.

2. The method of claim 1, wherein the commands include commands for generating graphical images associated with the markup language document.

3. The method of claim 1, wherein the name of each of the property variables includes a sequence number indicating an execution order for the command obtained from the value of said each property variable in relation to the commands obtained from the values of other property variables.

4. The method of claim 3, wherein the name of said each property variable includes an alphanumeric prefix and a numerical suffix as said sequence number.

5. The method of claim 1, wherein the step of obtaining includes parsing the value of said each property variable to retrieve the command associated with said each property variable.

6. The method of claim 1, further including the step of storing the commands associated with the respective property variables in an ordered command list in accordance with the execution sequence prior to execution of the commands.

7. The method of claim 1, wherein the markup language is the Hypertext Markup Language (HTML).

8. The method of claim 7, wherein the statements defining the property variables represent PARAM elements of the HTML markup language document.

9. A computer-readable medium having computer-executable instructions for performing the steps of:
    retrieving values of a plurality of property variables from a markup language document written in a markup language and having a plurality of statements defining said plurality of property variables, names of the plurality of property variables provided in accordance with an order-defining naming convention to indicate an execution sequence;
    obtaining from the value of each of the property variables a command associated with said each property variable; and
    executing the commands associated with the property variables in the execution sequence indicated by the names of the property variables.

10. The computer-readable medium of claim 9, wherein the commands associated with the property variables include commands for generating graphical images.

11. The computer-readable medium of claim 9, wherein the name of each of the property variables includes a sequence number indicating an execution order for the command associated with said each property variable in relation to the commands associated with the other property variables.

12. The computer-readable medium of claim 11, where in the name of said each property variable includes an alphanumeric prefix and a numerical suffix as said sequence number.

13. The computer-readable medium of claim 9, wherein the step of obtaining includes parsing the value of said each property variable to obtain the command associated with said each property variable.

14. The computer-readable medium of claim 9, including further computer-executable instructions for performing the step of storing the commands obtained from the values of the property variables in an ordered command list in accordance with the execution sequence prior to execution of the commands.

15. The computer-readable medium of claim 9, wherein the markup language is the Hypertext Markup Language (HTML).

16. The computer-readable medium of claim 15, wherein the statements defining the property variables represent PARAM elements of the HTML markup language document.

* * * * *